(No Model.)

J. C. WILSON.
SIGNAL BOX.

No. 448,398. Patented Mar. 17, 1891.

Witnesses
Fred L. Emery,
John F. C. Printlert

Inventor,
John C. Wilson,
by Crosby & Gregory
Attys.

United States Patent Office.

JOHN C. WILSON, OF BOSTON, MASSACHUSETTS, ASSIGNOR TO THE MUNICIPAL SIGNAL COMPANY, OF PORTLAND, MAINE.

SIGNAL-BOX.

SPECIFICATION forming part of Letters Patent No. 448,398, dated March 17, 1891.

Application filed May 17, 1887. Serial No. 238,458. (No model.)

*To all whom it may concern:*

Be it known that I, JOHN C. WILSON, of Boston, county of Suffolk, and State of Massachusetts, have invented an Improvement in Signal-Boxes, of which the following description, in connection with the accompanying drawings, is a specification, like letters and figures on the drawings representing like parts.

This invention has for its object to construct a signal-transmitting apparatus adapted to transmit several different signals, it being especially applicable for police-signaling.

In accordance with this invention a single contact-pen is secured to a rotatable shaft and the signaling-surfaces with which the pen co-operates are brought into the path of the movement of the pen by means operable by a pointer which is designed to be moved on a suitable dial marked off to indicate the signal. The signaling-surfaces are herein shown as strips of metal notched to present an irregular or toothed surface, and the strips are secured transversely to a flexible band or chain passing over two wheels or pulleys—such as sprocket-wheels, for instance—and one of the shafts carrying the sprocket-wheels is provided with a toothed wheel which is driven by an engaging toothed wheel fixed to a shaft to which the pointer is attached, so that as the pointer is moved the signal-carrying band will be moved to present one or another signaling-surface to the pen.

A suitable motor mechanism and actuating-pull is employed for rotating the pen.

Figure 1:
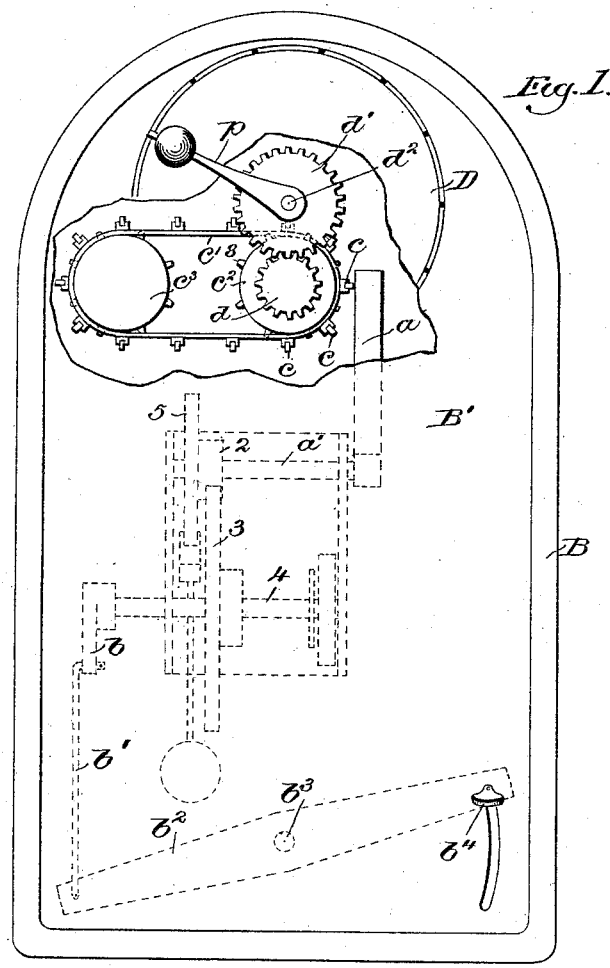
Figure 2:
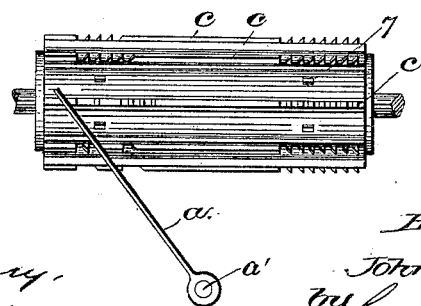

Figure 1 shows in front elevation a signal-box provided with a signal-transmitter embodying this invention, and Fig. 2 an end view of the signaling-surfaces and the co-operating contact-pen.

The contact-pen $a$ is secured to the outer end of a shaft $a'$, having its bearings in a suitable frame-work. A pinion 2 is secured to the shaft $a'$, which is driven by a toothed wheel 3, fixed to a shaft 4, upon which latter shaft the main spring is mounted, thereby serving as a winding-shaft. A scape-wheel 5 is fixed to the shaft $a'$ to regulate the speed of the motor. A crank-arm $b$ is fixed to the winding-shaft 4, which is connected by a link $b'$ to one end of an actuating lever or pull $b^2$, pivoted at $b^3$, the opposite end of the said lever being provided with a finger-piece $b^4$. The motor, as described, is adapted to be wound up by movement of the actuating-pull and to operate and thereby rotate the pen when the actuating-pull is released. The signaling-surfaces are arranged in groups, and each group consists of a strip of material $c$, provided with an irregular toothed or notched surface fixed transversely to a flexible endless band or chain $c'$, passing over or about two wheels or pulleys $c^2 c^3$. That the pen may always retain its original position it is provided with openings, as 7, which receive projections 8 of the wheels $c^2 c^3$, like unto a sprocket wheel or chain. The shaft of the wheel or drum $c^2$ is provided with the toothed wheel $d$, which is engaged and driven by a toothed wheel $d'$, fixed to a shaft $d^2$, to which latter shaft the pointer $p$ is also secured, so that as the shaft $d^2$ is rotated the wheel or pulley $c^2$ will be rotated, and thereby present a different signaling-surface to the pen $a$. The transmitter is designed to be placed within a suitable box B, having a face-plate B′, which is herein shown as broken out to show the transmitter behind it. The said face-plate is provided with a suitable dial D, preferably marked off or graduated, over which sweeps the pointer $p$.

It will be seen that by the construction herein shown a single signaling-surface is presented to the contact-pen which moves over it, sweeping in the arc of a circle at right angles to its axis $a'$. It will also be seen that a very large number of signals may be secured to the endless band or chain.

The transmitter herein shown is adapted to be operated in an open circuit; but I do not desire to limit my invention to such form of transmitter and its co-operative parts, as it is obvious that with but slight alteration it may be made to operate in a closed circuit.

I claim—

1. A multiple-signal transmitter comprising an endless band and a series of groups of signaling-surfaces, each group arranged transversely thereon, and a contact-pen adapted to co-operate with any one group of signaling-surfaces, substantially as described.

2. A multiple-signal transmitter comprising a contact-pen, an endless band, and a series of groups of signaling-surfaces, each group arranged transversely on said band, and means for moving said band to present one or another group to the contact-pen, substantially as described.

3. A multiple-signal transmitter comprising a band having on it a series of signaling-surfaces, a cylinder over which said band passes, a pointer for effecting the movement of the cylinder to present one or another signaling-surface to the plane of rotation of a contact-pen, a dial with which the pointer co-operates, a motor mechanism for rotating the contact-pen, and a starting-lever for the motor mechanism, substantially as described.

In testimony whereof I have signed my name to this specification in the presence of two subscribing witnesses.

JOHN C. WILSON.

Witnesses:
BERNICE J. NOYES,
FRED L. EMERY.